United States Patent [19]

Ganguly et al.

[11] 3,880,839
[45] Apr. 29, 1975

[54] PROCESS FOR THE PREPARATION OF RIFAMYCIN S AND ANALOGS THEREOF FROM THE HALOMICINS

[75] Inventors: Ashit K. Ganguly, Upper Montclair; Sol Szmulewicz, Hazlet; Olga Z. Sarre, Verona, all of N.J.

[73] Assignee: Schering Corporation, Bloomfield, N.J.

[22] Filed: Dec. 21, 1973

[21] Appl. No.: 427,195

[52] U.S. Cl............ 260/239.3 P; 424/244; 424/278
[51] Int. Cl...................... C07d 99/02; C07d 99/04
[58] Field of Search............................. 260/239.3 P

[56] References Cited
UNITED STATES PATENTS 3,821,199  6/1974  Cricchio...................... 260/239.3 P

*Primary Examiner*—Henry H. Jiles
*Assistant Examiner*—Robert T. Bond
*Attorney, Agent, or Firm*—Carver C. Joyner; Stephen B. Coan; Raymond A. McDonald

[57] ABSTRACT

Halomicin A, B and D may be converted to rifamycin S which may then be converted to rifampin by methods known in the art. Similarly, Halomicin C may be converted to an analog of rifamycin S which by analogy may be converted to a rifampin analog. The compounds so produced have antibacterial activity.

5 Claims, No Drawings

PROCESS FOR THE PREPARATION OF RIFAMYCIN S AND ANALOGS THEREOF FROM THE HALOMICINS

This invention relates to a novel process for preparing antibacterial agents. More particularly, this invention relates to a novel process for converting halomicins A, B and D to rifampin and halomicin C to an analog thereof.

PRIOR ART

In U.S. Pat. No. 3,511,909 (issued May 12, 1970), the preparation of the halomicin complex by microbial fermentation is described. The complex is elaborated by *Micromonospora halophytica* var. *halophytica* and a variant thereof which is designed *Micromonospora halophytica* var. *nigra*. The microorganisms are on deposit at the U.S. Department of Agriculture, Northern Utilization Research and Development Division in Peoria, Illinois where they are designated NRRL 2998 and NRRL 3097, respectively. The halomicins are not identified by structural formulae in the patent but are so identified hereinbelow.

Rifampin (also known as rifampicin) is a known commercially available antibacterial agent whose synthesis from 3-formyl rifamycin SV is described by N. Maggi et al., in Chemotherapia 11:285–292 (1966). Rifampin may also be prepared directly from rifamycin S via a process described in Belgian Pat. publication No. 716123, which corresponds to Derwent No. 35,091 (1968). The compound is used either alone or in combination with other therapeutic agents for treating persons afflicted with tuberculosis.

The halomicins, like the rifamycins are members of a class of antibacterial agents referred to in the art as the ansamycins. The halomicins, like the rifamycins, are potent antibacterial agents, as can be determined from the disclosure of the above-noted U.S. Pat. The structure of halomicin B, the major component of the complex, is depicted in formula I below:

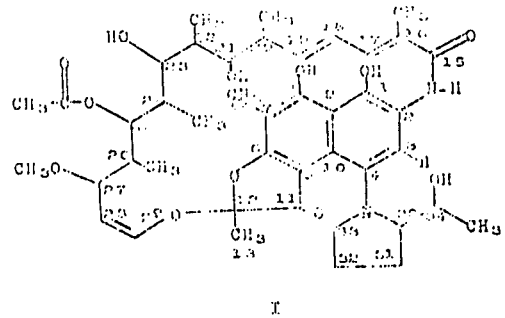

I

On the basis of elemental analysis, spectral studies and other physicochemical measurements it is believed that the structures of halomicins A, C and D are as set forth in formulae II and III below:

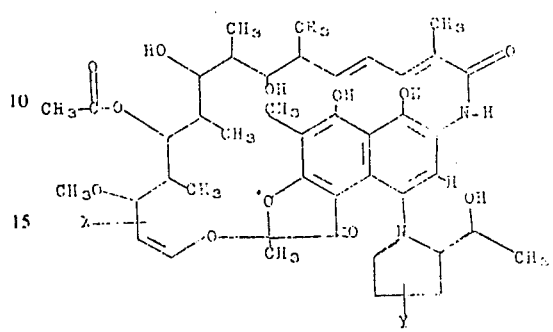

II

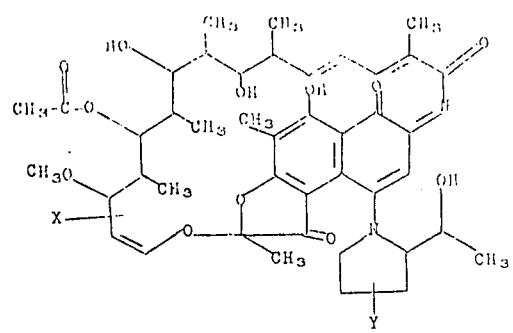

III wherein X and Y are members selected from the group consisting of hydrogen and hydroxyl with the proviso that Y may occupy either of positions 31 or 32. In halomicin A (formula II) X is hydrogen and Y is hydroxyl; in halomicin C (formula II) X is hydroxyl and Y is hydrogen; in halomicin D (formula III) X and Y are hydrogen, however, conventional elemental analyses and spectral studies show that halomicin D has two hydrogens less than halomicin B and suggest that the nitrogen in the ansa ring bridging carbons 2 and 15 is connected to the carbon in position 2 via a double bond.

On the basis of the above-mentioned analyses and spectral studies, the halomicins have the following physicochemical properties:

| Constant | Elemental Analyses | | | |
| --- | --- | --- | --- | --- |
| | Halomicin A | Halomicin B | Halomicin C | Halomicin D |
| | $C_{43}H_{58}N_2O_{13}$ | $C_{43}H_{58}N_2O_{12}$ | $C_{43}H_{58}N_2O_{13}$ | $C_{43}H_{58}N_2O_{12}$ |
| m.p. | 187°–189°C | 178°–182°C | 189°–193°C | 177°–182°C |
| $[\alpha]_D$ (dioxane) | +100.5° | +73.1° | +153.0° | +142.1° |
| U.V. $\lambda_{max}$ | 234 nm | 238 nm | 237 nm | 234 nm |
| | (46,000) | (42,161) | (38,300) | (48,268) |
| | 302 nm | 298 nm | 301 nm | 328 nm |
| | (18,700) | (14,187) | (10,900) | (14,946) |
| | 419 nm | 415 nm | 420 nm | 440 nm |
| | (14,160) | (20,341) | (16,400) | (9,319) |

The halomicins, by virtue of processes described below may be converted into rifamycin S or analogs thereof. Rifamycin S may subsequently be converted to rifampin by methods known in the art.

Thus, the invention sought to be patented may be described as a process whereby halomicin A, halomicin B or halomicin D is subjected to the action of an oxidizing agent under acidic conditions at ambient temperatures to yield rifamycin S.

The invention sought to be patented in another aspect may be described as a process whereby halomicin C is subjected to the action of an oxidizing agent under acidic conditions at ambient temperatures to yield a hydroxylated analog of rifamycin S. Therefore, the invention sought to be patented may be described as a process for oxidizing the halomicins under controlled conditions to yield rifamycin S or a hydroxylated analog thereof, wherein the hydroxyl group is a substituent on the ansa ring.

By a process of this invention a solution of halomicin A, halomicin B or halomicin D in a suitable organic solvent is treated with an oxidizing agent whereby removing the substituted pyrrolidino moiety from the 4-position of the aromatic ring thereby producing rifamycin S. In the case of halomicin D, under the experimental conditions the double bond between carbons 2 and the nitrogen bridging carbons 2 and 15 shifts back into the fused carbocyclic aromatic ring of which carbon 2 is a constituent.

In a similar manner, by the process of this invention a solution of halomicin C in a suitable organic solvent is treated with oxidizing agent under acidic conditions thereby removing the substituted pyrrolidino moiety from the 4-position of the aromatic ring producing a hydroxylated analog of rifamycin S wherein said hydroxyl is a substituent of the ansa ring.

The preferred organic solvents in which the process of this invention may be effected are the lower alcohols especially methanol, however, other solvents such as cyclic ethers such as tetrahydrofuran may also be employed. In general, those organic solvents wherein oxidations are normally effected may be used for the instant process.

The oxidation is preferably effected in the presence of a mineral acid although other acids, e.g. alkyl, aryl or aralkyl sulfonic acids may be employed. Nitrous acid is preferred since it serves the dual function of maintaining an acid pH and of being the oxidizing agent.

Having described the instant invention generally, the following example sets forth the best mode contemplated for effecting this invention.

EXAMPLE 1

Rifamycin S from Halomicin B

To a solution of 0.47 g. of halomicin B in 50 ml. of methanol, add a solution of 2.5 g. of sodium nitrite in 2.5 ml. of water. Add 25 ml. of 5% hydrochloric acid dropwise with stirring. The reaction mixture should be acid to congo red. Remove the methanol *in vacuo*; then extract the aqueous reaction mixture with chloroform. Wash the chloroform layer with water, dry over anhydrous sodium sulfate and evaporate to obtain a red solid. Purify the crude rifamycin S (red) by preparative thin-layer chromatography on silica gel plates (GR; 500u thickness) using (7%) methanol; (93%) chloroform as the solvent system. Extract the red band with acetone, filter and evaporate to obtain 0.265 g. of rifamycin S (red). Dissolve the product in tetrahydrofuran and add 1 drop of 0.1 N *hydrochloric acid*, dilute the solution with water and extract with chloroform. Wash the chloroform extract with water, dry over anhydrous sodium sulfate and evaporate to dryness to obtain the orange tautomeric form of rifamycin S.

Similarly, halomicin A, and halomicin D may be converted to rifamycin S by use of an equivalent quantity of the respective compounds in the foregoing reaction. Halomicin C is converted to an analog of rifamycin S under substantially the same conditions, said analog having an additional hydroxyl group in the ansa ring.

We claim:

1. A process which comprises oxidizing halomicin A, halomicin B or halomicin D under acidic conditions to yield rifamycin S.

2. A process as defined in claim 1 wherein halomicin C is oxidized under acidic conditions to yield a hydroxylated analog of rifamycin S wherein the hydroxyl group is a substituent on the ansa ring.

3. A process according to claim 1 wherein the process is effected at ambient temperature using nitrous acid as the oxidizing agent and a lower alcohol as solvent.

4. A process according to claim 3 wherein the process is effected at ambient temperature using methanol as the solvent and nitrous acid as the oxidizing agent.

5. A process according to claim 1 which comprises oxidizing halomicin A, halomicin B or halomicin D at ambient temperatures under acidic conditions using nitrous acid as the oxidizing agent and using methanol as the solvent to yield thereby rifamycin S.

* * * * *